United States Patent
Alvarado et al.

(10) Patent No.: US 7,386,304 B2
(45) Date of Patent: Jun. 10, 2008

(54) METHOD AND SYSTEM FOR TRANSFERRING DATA FOR UPGRADING FEATURES IN PORTABLE ELECTRONIC DEVICES

(75) Inventors: Douglas Alvarado, Surrey (CA); Douglas Charney, Richmond (CA)

(73) Assignee: VTech Telecommunications Limited (HK)

( * ) Notice: Subject to any disclaimer, the term of this patent is extended or adjusted under 35 U.S.C. 154(b) by 336 days.

(21) Appl. No.: 10/401,764

(22) Filed: Mar. 31, 2003

(65) Prior Publication Data

US 2004/0131086 A1 Jul. 8, 2004

Related U.S. Application Data

(60) Provisional application No. 60/438,529, filed on Jan. 8, 2003.

(51) Int. Cl.
*H04M 3/42* (2006.01)
*H04Q 7/20* (2006.01)

(52) U.S. Cl. .................................. 455/418; 455/426.1
(58) Field of Classification Search ................ 455/418, 455/419, 420, 414.1, 426.1
See application file for complete search history.

(56) References Cited

U.S. PATENT DOCUMENTS

| | | | |
|---|---|---|---|
| 5,161,184 A * | 11/1992 | Smith et al. | 379/413 |
| 5,483,586 A * | 1/1996 | Sussman | 379/218.01 |
| 5,794,141 A * | 8/1998 | Zicker | 455/418 |
| 5,802,460 A * | 9/1998 | Parvulescu et al. | 455/92 |
| 5,930,703 A * | 7/1999 | Cairns | 455/418 |
| 6,032,112 A * | 2/2000 | Onishi et al. | 704/201 |
| 2004/0165713 A1 * | 8/2004 | Leighton | 379/225 |

FOREIGN PATENT DOCUMENTS

| | | | |
|---|---|---|---|
| GB | 2 256 113 | | 11/1992 |
| GB | 2 329 555 | | 3/1999 |
| GB | 2329555 | A * | 3/1999 |
| JP | 62272728 | | 11/1987 |
| WO | WO 92 10047 | | 6/1992 |
| WO | WO 00 31994 | | 6/2000 |
| WO | WO 0184809 | * | 8/2001 |
| WO | WO 01/84809 | | 11/2001 |

OTHER PUBLICATIONS

British Search Report dated May 12, 2004.

* cited by examiner

*Primary Examiner*—Harry S. Hong
(74) *Attorney, Agent, or Firm*—Paul, Hastings, Janofsky & Walker LLP

(57) ABSTRACT

Systems and methods are described for providing connectivity to portable electronic devices, such as a cordless telephone, for the purpose of upgrading software features. In a preferred embodiment, portable electronic devices can be connected to a conventional household audio player via an audio input/out interface in the device to receive encoded data signals modulated in an audio band. The audio player can playback an audio signal stored in any of several different formats, including compact disc, audio cassette tape, MP3 file, or streaming audio, and can be physically connected an audio jack in the portable electronic device via a conventional audio cable. The device demodulates and decodes the signal and routes the transmitted data to memory registers for upgrading software stored in device memory.

21 Claims, 6 Drawing Sheets

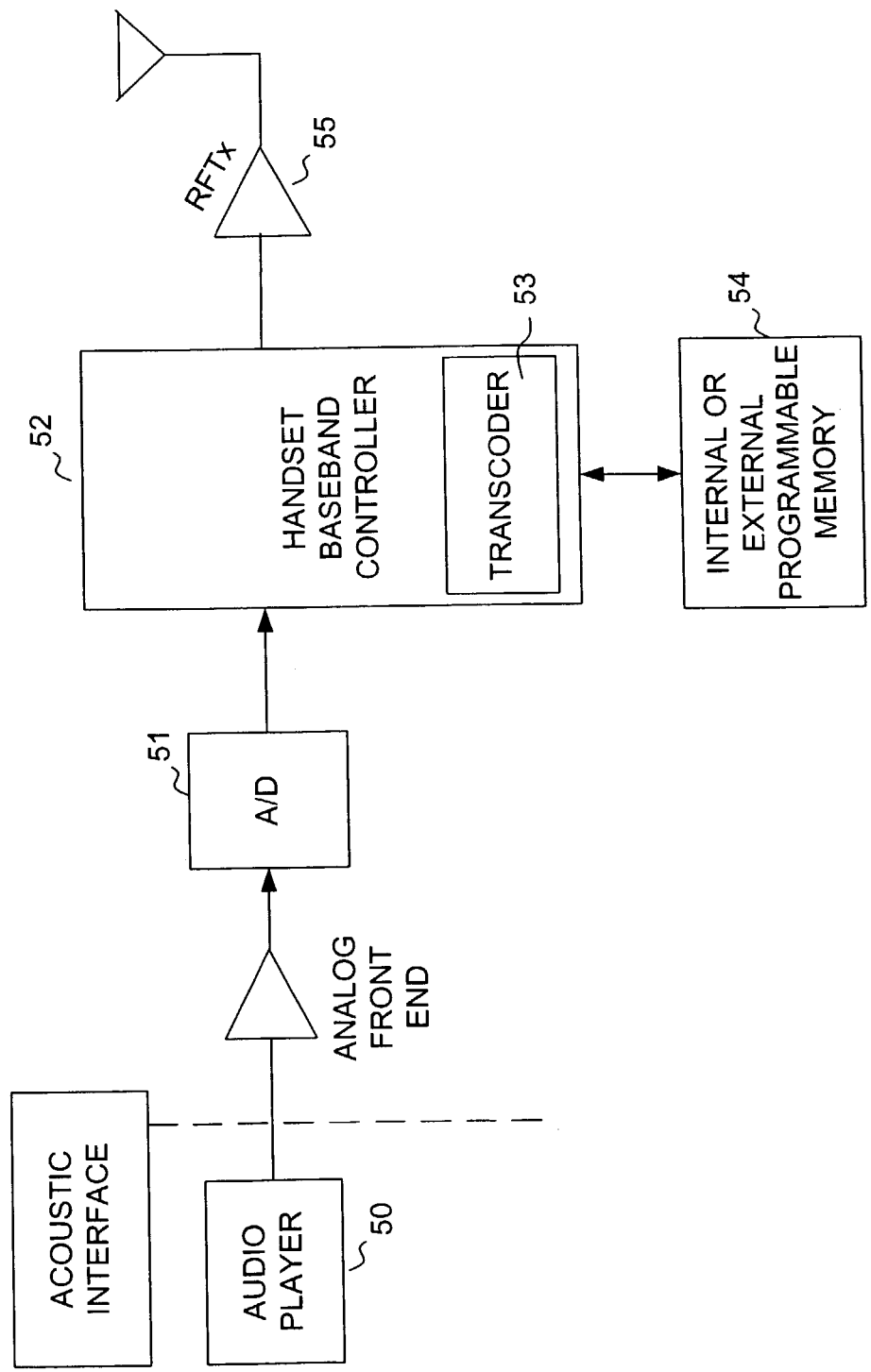

METHOD AND SYSTEM FOR TRANSFERRING DATA FOR UPGRADING FEATURES IN PORTABLE ELECTRONIC DEVICES

The present invention claims the benefit of U.S. Provisional Application No. 60/438,529, filed Jan. 8, 2003, which is incorporated by reference herein in its entirety.

BACKGROUND

1. Field of the Invention

The present invention relates generally to programmable electronic devices, and more particularly to methods for transferring data to update or program features in an electronic device.

2. Background of the Invention

A well-known strategy for maintaining demand for new consumer items, known as "planned obsolescence," is to continually design new consumer products with incremental technological improvements, such that consumers will wish to replace a consumer product with a new model every year or few years. With each year, new models for portable electronic devices become available with more memory, faster speed, and new or different features as compared to existing models. The rush of new product offerings has been particularly dramatic in the telephone industry, and especially for mobile cellular and cordless telephones. In addition to the standard functionality for placing telephone calls, modern telephones now include calling logs and telephone directories, and allow users to adjust ring volume and tone, among many other features. As one might expect, new telephone models are released each year with improved software for better features and functionality as compared with last year's telephones.

Although the strategy of planned obsolescence is effective for some consumer goods, in many circumstances it is more advantageous for companies to produce electronic devices that are programmable/upgradeable. This is popular with many consumers, who will opt to purchase a slightly higher cost item if it does not need to be replaced as frequently. Additionally, companies can earn revenue by selling software upgrades/updates, and can correct software bugs and perform other warranted repairs more easily and cost-effectively. Therefore, by producing electronic devices that are upgradeable, companies often can foster consumer goodwill and loyalty while still maintaining or improving profit margins.

By designing electronic devices to be upgradeable, manufacturers can also offer "after-market" software that enables users to customize the product. For instance, cordless telephones are now becoming available that enable users to adjust ring tone and graphics displays, and otherwise personalize the user interface. Users can make selections from lists of options stored in telephone memory to customize the telephone to the respective user's preferences. Since many consumers may be willing to purchase selections different from the standard offerings (there are an infinite number of possible ring tones) if they were made available, a market is created for software upgrades for cordless phones.

Unfortunately, the designs and operability of many types of portable electronic consumer devices renders it difficult to include functionality for upgrades. For example, once a digital device such as a cordless telephone is released into the consumer market, it becomes very difficult to upgrade or update the telephone with new software or firmware. One obvious method for upgrading a telephone is to manually disassemble the telephone and replace the processor or memory, or temporarily remove the memory from the telephone to add new software. Of course, this method is not practical for the vast majority of consumers, who are unlikely to have the skills necessary to perform such tasks.

Even if a portable electronic device can be especially designed to enable software updates, this might not be cost effective if the benefits from including this functionality are outweighed by the associated additional costs of design and manufacture. Adding functionality to an electronic device may involve additional computer architecture design, software programming, parts and components, which can be expensive. Further, regardless of the development costs, consumers will not utilize such a feature unless the steps that are necessary to update the device are relatively uncomplicated and easy to be performed. Since many portable electronic devices, such as cellular or cordless telephones, have somewhat small GUI displays with limited interfaces, this can be particularly challenging. Finally, the additional components that are necessary to enable the device to be upgraded must not overwhelm the existing physical size of the device or the spacing of other components within the device. Since, for example, cellular and cordless telephones are designed to be lightweight and comfortably hand-held, the weight and size associated with every component is always an important design consideration.

Accordingly, there is a need for a method and system for transferring data to a portable electronic device to facilitate updating and upgrading the functionality of the device, and which is relatively easy to use and does not significantly contribute to the cost, size and weight of the device.

SUMMARY OF THE INVENTION

Systems and methods are described for providing connectivity to portable electronic devices, such as a cordless telephone, for the purpose of upgrading software features. In a preferred embodiment, portable electronic devices can be connected to a conventional household audio player via an audio input/output interface in the device to receive encoded data signals modulated in an audio band. The audio player can play back an audio signal stored in any of several different formats, including compact disc, audio cassette tape, MP3 file, or streaming audio, and can be physically connected to an audio jack in the portable electronic device via a conventional audio cable. The device demodulates and decodes the signal and routes the transmitted data to memory registers for upgrading software stored in device memory.

A method is described for transferring data (binary software) for upgrading a portable electronic device. The binary software is encoded/modulated in the audio spectrum and is received via an audio input interface. The audio signal is then decoded/demodulated, and once it is back in its binary form, the new data is routed to programmable memory for operating the portable electronic device.

A method is described for programming a portable electronic device. The device is switched from an operations mode to a programming mode. Executable software code is uploaded to the device via an audio input interface. The software is encoded as a signal in an audio band. The audio signal is decoded and stored in programmable memory; and the device is switched from the programming mode to the operations mode.

A programmable portable electronic device is also described. An audio input interface receives encoded audio information signals. A decoder decodes encoded signals, and a switch switches between a programming mode and an operation mode. When the device is in a programming mode, executable software code that is encoded as a signal in the audio band is uploaded via the audio input interface and decoded in the decoder for programming memory in the device.

BRIEF DESCRIPTION OF THE DRAWINGS

FIGS. 5A and 5B are schematic diagrams of components of a cordless telephone system in accordance with an embodiment of the present invention.

DETAILED DESCRIPTION OF THE PREFERRED EMBODIMENTS

Figure 1:
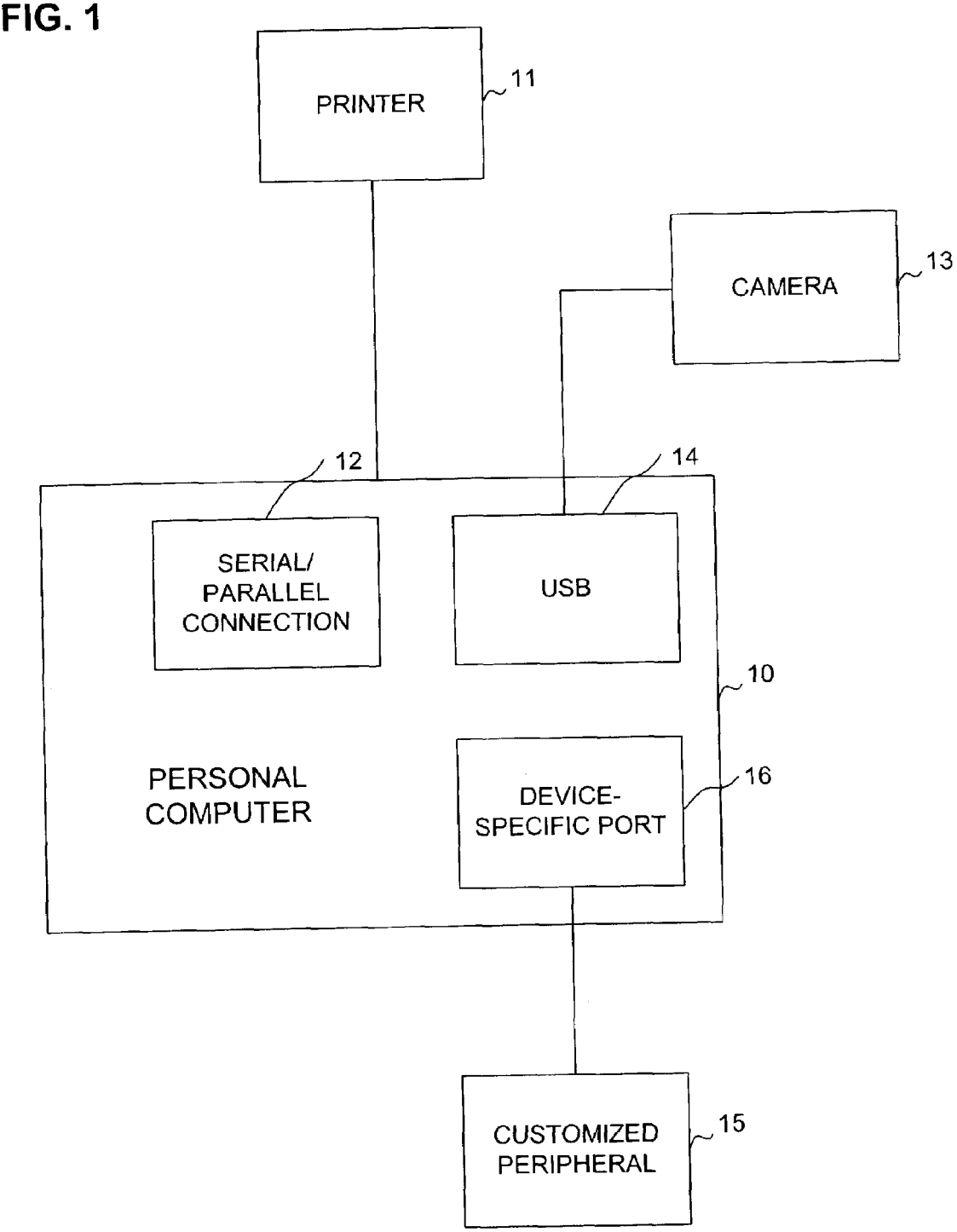
FIG. 1 is a schematic diagram of a conventional arrangement of a plurality of peripheral devices for a personal computer.

Data may be transmitted to electronic devices in several possible formats in accordance with a variety of different mechanisms. For instance, one method for communicating data to electronic devices or systems is via conventional peripheral ports on a personal computer or laptop computer, as shown in FIG. 1. As examples, a conventional printer 11 can be connected to a computer 10 via a serial/parallel connection 12 (utilizing an RS-232 cable), or a digital camera 13 may connect to a computer 10 via a USB port 14 (utilizing a USB cable). Instead of utilizing a conventional connection, it is also possible to connect a peripheral via a device-specific connection at a port 16 utilizing a device-specific protocol.

In addition to communicating data to or from such peripheral devices in the ordinary course of operation (e.g., sending information to be printed to printer 11, or sending pictures to be stored in memory from camera 13), it is possible to upgrade memory within the peripherals through these connections. As an embodiment of the present invention, FIGS. 2A and 2B each illustrate a connection of a cordless telephone to a personal computer or laptop computer to upgrade functionality with the telephone. As can be seen, the personal computer can be connected either to the base set of the cordless telephone, in FIG. 2A, or to the handset of the cordless telephone (or that of a cellular or other mobile, wireless communications device), in FIG. 2B. The telephone can be connected according to any of a plurality of protocols, such as a serial/parallel interface or a USB connection.

Figure 2A:
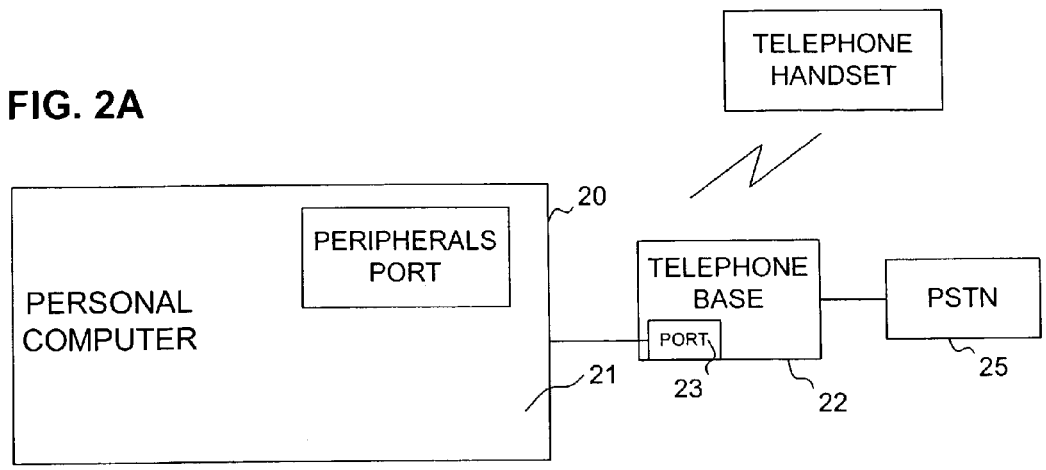
FIG. 2A is a schematic diagram of a connection of a personal computer to a base of a cordless telephone according to an embodiment of the present invention.
Figure 2B:
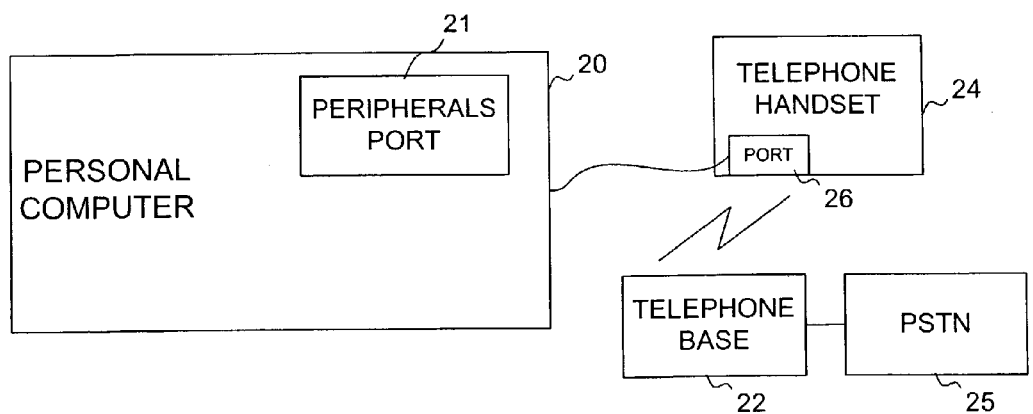
FIG. 2B is a schematic diagram of a connection of a personal computer to a handset of a cordless telephone according to an embodiment of the present invention.

In FIG. 2A, personal computer 20 is communicatively connected to telephone base 22 via peripherals port 21 and port 23 at the telephone base. Telephone base is then connected to PSTN 25 for landline telephone communications to and from telephone handset 24. In FIG. 2B, the peripherals port 21 is connected directly to the telephone handset 24 via port 26.

Along with other competing factors, such as size/spacing, weight, or cost considerations, the choice of whether to provide an "update" input port at either the base 22 or at the handset 24 of a telephone can be determined in part based upon the physical location of the memory that is to receive the majority of software updates in the cordless telephone system. For example, if ringtone software (i.e., different tunes or sounds to be made when the telephone is "ringing") is to be updated, and this software is stored in the handset's memory, then it may be more efficient to transmit update information directly to the handset. Otherwise, all update data will have to be retransmitted through an RF link from telephone base to the handset. In a similar manner, if voicemail software is to be updated, and this software is stored in the memory of a controller in the telephone base 22, then it may be more efficient to transmit update information directly to the base.

If a peripherals input port is included in either the handset or the base, the telephone controller can be configured to enable memory in the telephone to receive software updates. This can be done according to one of several possible protocols. For example, an option may be presented in the graphical user interface (GUI) of the telephone for the user to temporarily operate the telephone in a "programming mode." This mode will temporarily disable normal phone operations and make available memory space for the information being received via the input port. As an alternative, the CPU may automatically switch the telephone into a programming mode once a signal is presented at the input port. Presence of a signal at the input port can then trigger a display at the GUI to notify the user of the status of an update in progress and when the update is completed.

Unlike many portable electronic devices, such as printers, digital cameras, MP3 players, etc., which are designed to communicate with a personal computer via peripheral ports in the course of normal operation, portable electronic devices such as cordless telephones or mobile, cellular telephones do not typically include a data port for communication with another electronic device. Therefore, in order to communicate with a personal computer through the telephone base or the handset, it is necessary to provide an input port and associated circuitry solely for the purpose of enabling upgrades. In that instance, the additional parts and design costs associated with provision of the input port are attributed solely to provision of this feature. Furthermore, it is possible that many consumers who purchase the cordless telephone or mobile telephone do not have a personal computer or a cable for connecting the computer to the device. These consumers will not be able to upgrade their devices, and the added cost associated with incorporating this feature will be wasted.

Although most portable electronic devices, especially cordless telephones and mobile telephones, do not utilize an input data port, it is common for such devices instead to include an audio input/output interface, or "audio jack," for communicating data in an audio band to and from the device. In a cordless telephone or mobile telephone, for example, this interface is typically configured as a "headset jack" for connecting (or "plugging in") a mini microphone and speaker assembly to enable hands-free communications. While such headset jacks are common in modern cordless telephones, use of these interfaces is a requirement for operating a mobile, cellular telephone in many jurisdictions while driving a motor vehicle.

Figure 3:
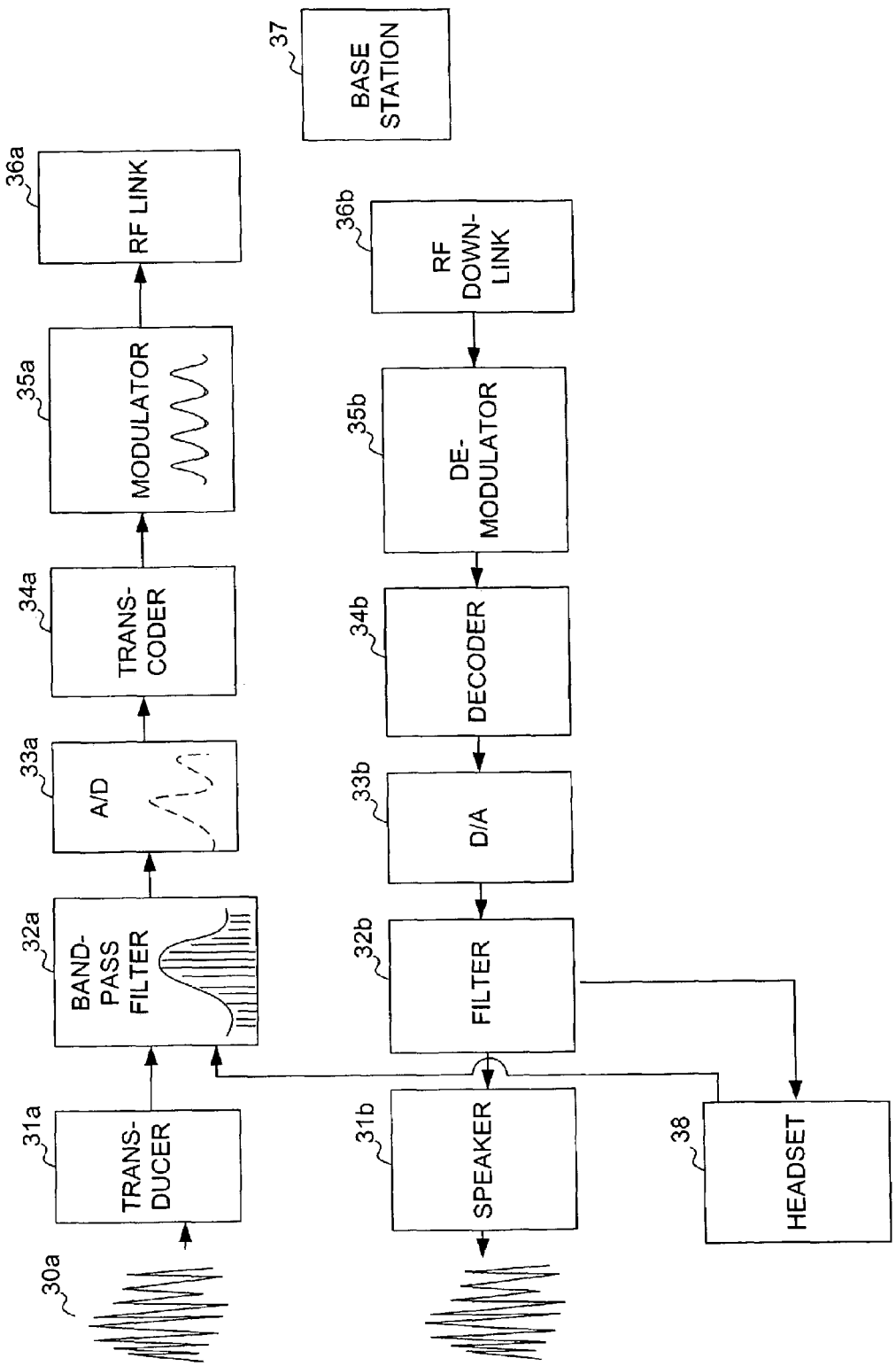
FIG. 3 is a schematic diagram of components in a handset of a cordless telephone.

A headset bypasses the microphone and receiver that are integrated into the telephone. As shown in FIG. 3, a telephone transmits a voice signal from a user by converting spoken voice vibrations 30a into an analog electrical signal via a transducer 31a, which is then filtered via a bandpass filter 32a and sampled in an analog-to-digital converter 33a at a sufficiently high rate to capture the voice signal (e.g., according to the Nyquist rate). In a cordless telephone, the digital signal is then transcoded (or compressed) 34a and modulated 35a for transmission over an RF link 36a to the base unit 37, where it is demodulated, decompressed, converted back to an analog signal and ultimately transmitted along the PSTN. Voice signals are received in the speaker of the handset by being received through RF link 36b, demodulated in demodulator 35b, and decompressed in decoder 34b. The signal is then converted back to an analog signal from D/A converter 33b, filtered 32b, and sent to a speaker 31b. A headset 38 replaces the transducer and speaker assembly 31a, 31b that is integrated into the telephone.

In addition to the "headset jack," modern cordless telephones and mobile cellular telephones also typically include a digital signal processor (DSP) for decoding and processing control signals that are incident to the telephone from the PSTN or wireless network. Particularly, through the advanced intelligent network (AIN), modern telephones that are "caller-ID enabled" can decode a frequency-shift-key (FSK) encoded signal that is transmitted along with a ringing signal over the telephone network. The FSK encoded signal typically contains a calling party name and telephone number. When this is decoded using an integrated DSP, the telephone forwards at least some of this information to the telephone display, and may also store at least the incoming telephone number in memory apportioned as a calling log. Therefore, a modern telephone already includes the necessary components and processing capability for receiving encoded signals forwarding data to the telephone display and memory registers.

In a preferred embodiment of the present invention, a portable electronic device that contains an audio jack and a DSP, such as a cordless telephone or a mobile cellular telephone, is configured to enable upgrading software in the device with a number of possible deployment options, each via a temporary connection through the audio jack. In other words, the data source need not be a personal computer or laptop, but may instead be any device that is capable of inputting a signal into an audio jack. In addition to personal computers and laptops, this might include compact disc players, radios, MP3 players, cassette players, VCRs, or any other source that is conventionally available to a typical consumer. Using components and circuitry for this purpose that are already in use in, for example, a modern telephone, can add functionality without significantly increasing costs. Further, the existing GUI capabilities and simplicity of connecting audio devices to the device's audio jack provides an easy-to-use system.

The software that is to be stored in memory of the portable electronic device can be converted into signals in the audio band according to known techniques, such as by FSK-encoding software code that is in executable form into a set of audio frequencies. Since the incoming audio data signal will be used only for a specific purpose in the device, it may be unnecessary to include header packets identifying transmission protocol.

Figure 4:
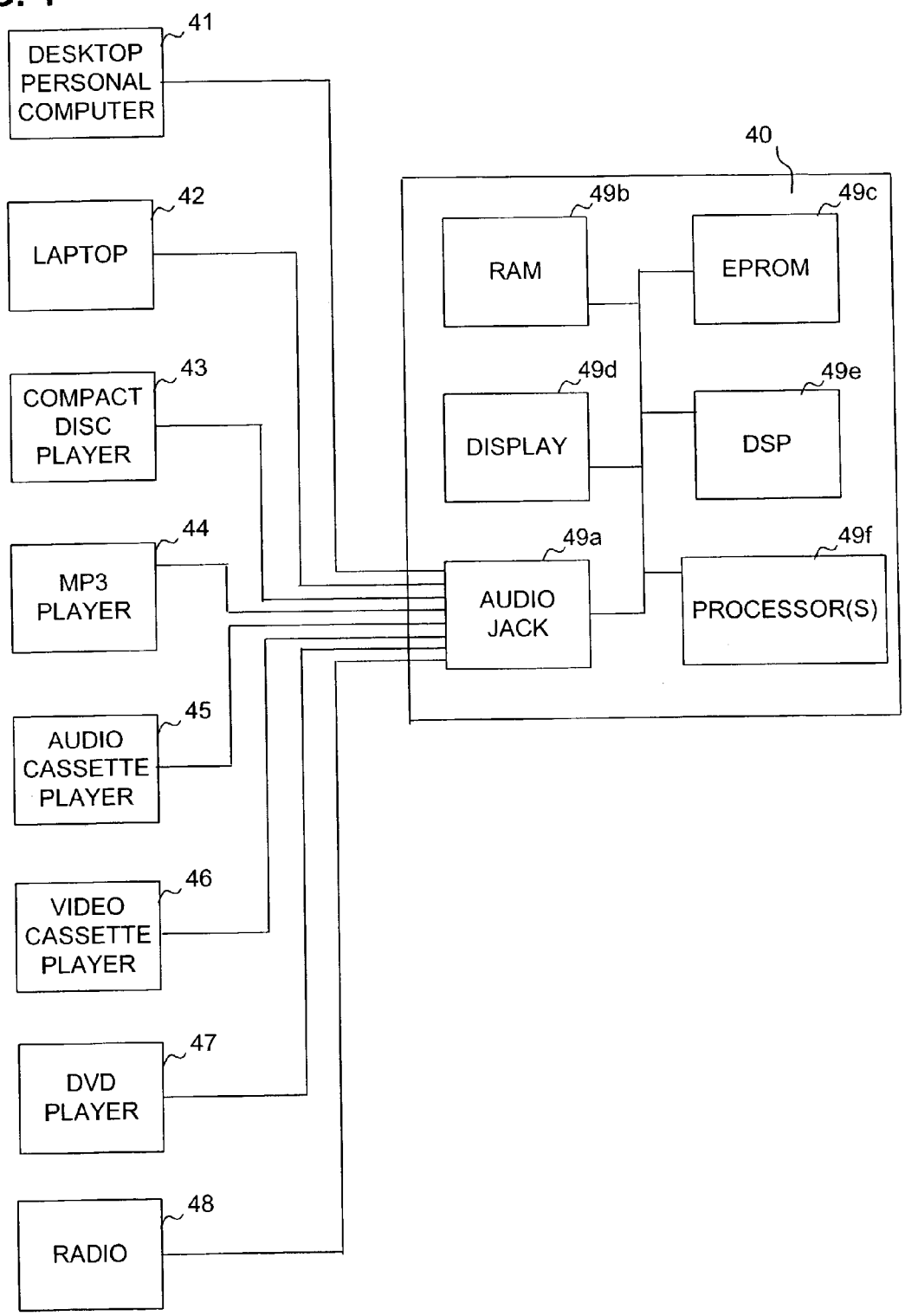
FIG. 4 is a schematic diagram of a connection of a plurality of data sources to a portable electronic device according to an embodiment of the present invention.

FIG. 4 represents the usage models for a data transfer mechanism in a typical digital cordless telephone or mobile cellular telephone, according to embodiments of the present invention. As can be seen, using a standard audio cable with stereo or mono plugs, the audio input jack of a telephone 40 can connect to an audio output of a personal computer (the audio output jack of the personal computer is typically connected to computer desktop speakers) 41 or laptop 42, or any of a host of media players, including a compact disc player 43, MP3 player 44, audio cassette player 45, video cassette player 46, DVD player 47, or radio 48.

For the purposes of this diagram, the components of telephone 40 are illustrated as being together, although in a cordless telephone, the components will be separated into handset components and base station components (as will be described in further detail below). The telephone system 40 includes an audio input jack 49a, programmable memory such as RAM 49b or EPROM, 49c, a display 49d, a DSP 49e for decoding caller-ID signaling, and another processor or set of processors and controllers 49f for accessing memory, running applications and generating displays. The processor/controller(s) 49f additionally include a switch for alternating between a telephone mode and a "programming" mode of operation.

Each of these sources of audio input data 41-48 can be utilized differently to provide software upgrades according to different business models. Preferably, desktop or laptop computers that are Internet-enabled can download this data, receive a RealAudio™ or Windows Media™ stream, or receive emails containing attachments with the data, as a ".wav" or MP3 file for playback. As can be appreciated, this method enables a consumer to easily upgrade the portable electronic device by simply plugging the device to the audio output jack of the consumer's PC, and it is inexpensive to implement and can be completely automated (via conventional e-commerce/e-pay mechanisms). Particularly, a customer service center of a telephone manufacturer can operate a website for providing free downloads for warranty-related software or recalls, and fee-for-download for optional upgrades (e.g., new ringer tones, new voicemail capabilities, etc.).

Alternatively, a telephone manufacturer can provide (perhaps by mail or store purchase) CD-ROMs, diskettes, compact discs, audio or video cassettes, or DVDs containing audio data. Conceivably, a radio station can also schedule radio programming of an FSK-encoded stream, which can then be played from the radio directly into the input port.

Figure 5B:
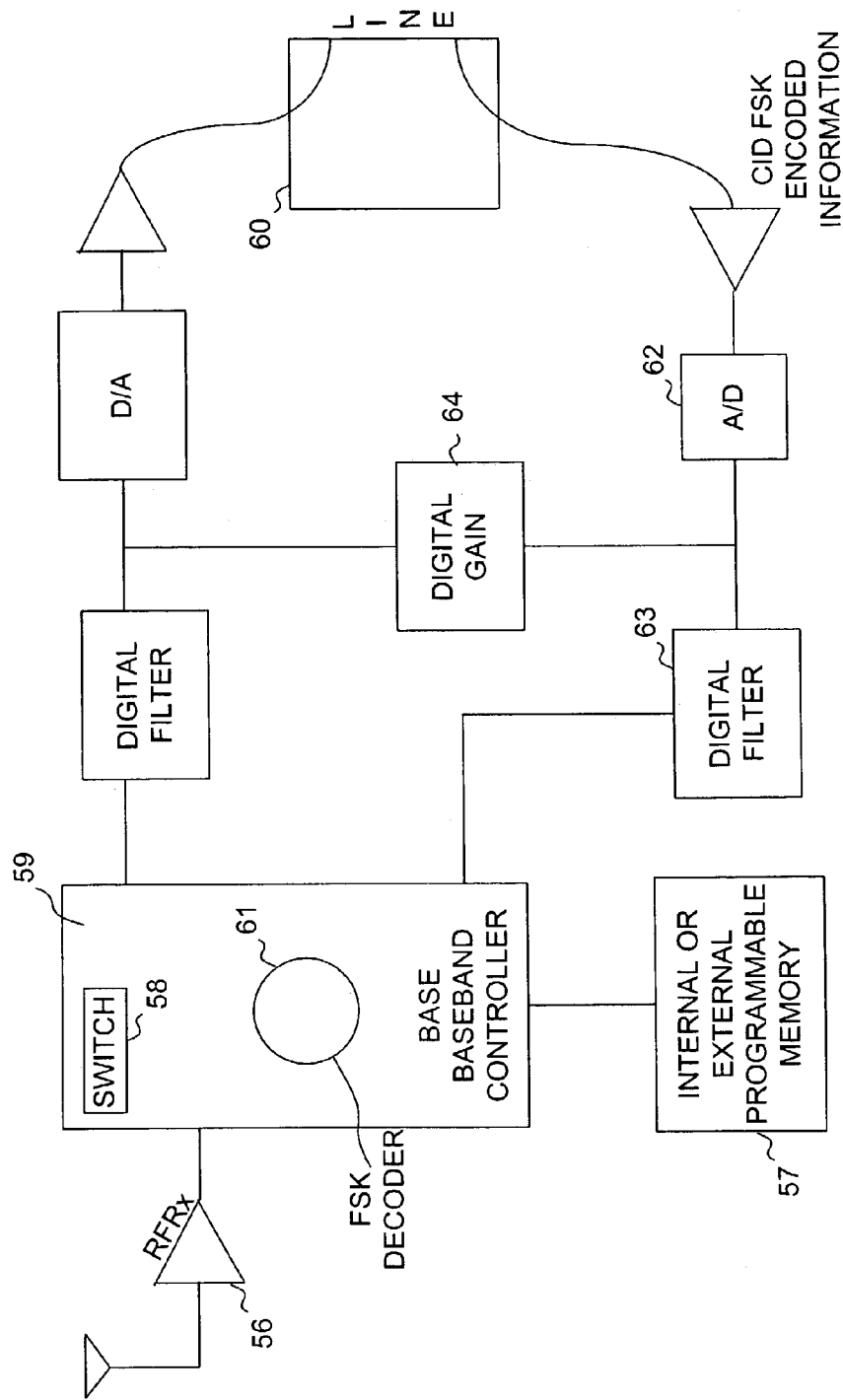

FIGS. 5A and 5B are schematic diagrams illustrating processing and communications that occur in a handset and a base station of a cordless telephone system in accordance with an embodiment of the present invention. As described with reference to FIG. 5B, cordless telephones in this configuration process caller ID (CD) information that is input to the base station controller via the telephone line from the PSTN 60. FSK encoded caller ID signals are converted to digital signals in A/D converter 62, amplified in amplifier 64, and filtered in digital filter 63, before being input to a base baseband controller 59, where the signal is decoded in an FSK decoder 61. In accordance with an embodiment of the invention and referring to FIG. 5A, updated software in its native binary form is encoded using FSK modulation in the audio band and is introduced into the cordless telephone via an audio player 50, which plays back an audio signal containing the FSK modulated information.

Similar to the description with reference to FIG. 3, once analog audio information is fed into the handset via the audio jack, it is filtered through a band pass filter and converted to a digital signal via an A/D converter 51. The handset baseband controller 52 includes a transcoder 53 to compress the signal, modulate it, and transmit the signal over an RF medium 55.

Referring now to FIG. 5B, during conventional operation, once a modulated signal from the handset is received at an RF medium 56 in the base, the signal is demodulated, decoded, and sent to the line interface circuit 60 and out to the PSTN. During operation in accordance with an embodiment of the invention, upon detecting in the base baseband controller 59 that the cordless set is in a "programming" mode (conceptually represented by software or memory-based switch 58), the signal is instead routed within the controller to the base FSK/CID decoder 61. The base FSK decoder then decodes the digital information into its native binary format, which can be stored in the base programmable memory 57 or routed back to the RF transmitter/receiver interface 55, 56 for storage back in the handset memory 54.

The process of transmitting the information back to the handset memory 54 may use what is known as a 'connectionless' transmission mechanism, since there is no acknowledgement return signal from the handset device that it has received the information uncorrupted. In that case, error correction techniques can be used on the binary data prior to the FSK encoding phase. Alternatively, this technology may use a 'connection' oriented transmission mechanism if the playback device is able to decode information from the portable device (only if the playback device also has an analog input/output and processing capabilities).

In summary, digital update information for a portable electronic device may be encoded in the analog voice-band domain via an external program and hardware, which may be performed by the product's manufacturer, or a third party provider. To upload the data, the portable electronic device, such as a cordless phone user, may enter a user-selectable programming mode (either via a known key sequence or via the telephone's GUI menu), thereby prompting the device to "listen" or detect input incident to an audio jack on the portable electronic device. Alternatively, the system may automatically enter into a programming mode upon detecting an FSK-encoded signal received through an audio jack. In either case, if the audio jack is in the handset, the handset will then convert the inputted analog information into the digital domain (e.g., via A/D converters, a linear PCM voice coder and an ADPCM transcoder) and modulate and uplink the signal to the base unit via an RF link. The base bandband controller will then transcode the information (e.g., from ADPCM to linear PCM) and apply an algorithm to demodulate the FSK information to binary information.

Once the signal back in its binary form, the update/upgrade information can be stored in any of the processor's programmable memory (EEPROM, RAM, FLASH, etc.) or can be sent back to the handset via the RF link to be stored and used by the handset processor(s).

The examples described above illustrate how a portable electronic device can be upgraded using FSK encoded data and an FSK decoder. No particular modulation scheme is required, although it is advantageous to modulate the signal in accordance with the typical operation of the electronic device. The present invention is not intended to be limited to performing upgrades in a cordless telephone or a mobile telephone, instead, this method and system can be implemented in any electronic device having a DSP, and analog input and programmable storage. As described above, the incoming audio data signal can be received from a PC, but may also be received from other sources of audio output.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for transferring data for programming a cordless telephone system, comprising:
   receiving audio data in a device configured to transmit the audio data as an encoded audio signal;
   transmitting the encoded audio signal to the cordless telephone system via an audio jack of a handset of the cordless telephone system;
   converting the encoded audio signal into a modulated digital signal;
   sending the modulated digital signal to a base unit of the cordless telephone system;
   decoding the encoded audio signal into a native format at the base unit; and
   routing the decoded audio signal to programmable memory for operating the handset.

2. The method of claim 1, wherein the encoded audio signal is FSK encoded.

3. The method of claim 1, wherein the audio signal is transmitted via an BY link to the base unit for decoding in an FSK decoder in the base unit.

4. The method of claim 3, further comprising transmitting the decoded audio signal via an RF link from the base unit to the handset for storage in handset programmable memory.

5. The method of claim 3, further comprising transmitting the decoded audio signal for storage in base unit programmable memory.

6. The method of claim 4, wherein the transmitting the decoded audio signal via an RE link comprises a connectionless transmission.

7. The method of claim 1,
   wherein the device configured to transmit the audio data is one of a computing device and a media player, and
   wherein the receiving the audio data comprises one of receiving a CD-ROM, DVD, diskette, compact disk, audio cassette, and video cassette containing the audio data and downloading the encoded audio signal onto a computing device for playback through an audio output port to the audio jack of the handset.

8. The method of claim 7, wherein the computing device is one of a laptop, personal computer, and personal digital assistant, and wherein the media player is one of a compact disk player, an MP3 player, audio cassette player, video cassette player, and DVD player.

9. A method for programming a cordless telephone system, comprising:
   switching the system from an operations mode to a programming mode;

receiving executable software in a device configured to transmit the executable software as an encoded audio signal;

uploading the executable software code to a handset of the cordless telephone system via an audio jack, wherein the software is encoded as a signal in an audio band;

converting the encoded signal in the audio band into a modulated digital signal; forwarding the executable software in the modulated digital signal to a base unit of the cordless telephone system;

decoding the software in the modulated digital signal into a native format in the base unit;

storing the decoded signal in programmable memory for operating the handset; and switching the device from the programming mode to the operations mode.

10. The method of claim 9, wherein the system automatically switches to a programming mode upon receiving an encoded signal input via the audio jack.

11. The method of claim 10, wherein the audio jack is a microphone jack in the handset.

12. The method of claim 9, wherein the programmable memory is located in the handset.

13. The method of claim 9, wherein the programmable memory is located in the base unit.

14. The method of claim 9, wherein the switching the system from an operations mode to a programming mode comprises using one of a known key sequence and a graphical user interface of the cordless telephone system.

15. A programmable cordless telephone system, comprising:

an audio jack located in a handset of the system for receiving an encoded audio information signal;

a decoder located in a base unit of the system, the decoder configured for decoding encoded signals forwarded from the handset; and a switch for switching between a programming mode and an operation mode, wherein, when the system is in a programming mode, executable software code that is encoded as a signal in the audio band is uploaded via an audio jack, converted into a modulated digital signal, forwarded from the handset to the decoder, decoded into a native format in the decoder, and routed to programmable memory for operating the handset, and wherein the system is configured to transmit the executable software code decoded into its native format from the base unit to the handset via both a connectionless and a connection transmission.

16. The device of claim 15, further comprising:

a transmitter in the handset; and a receiver in the base unit for communicating uploaded audio signals to the decoder.

17. The device of claim 15, wherein the audio jack is connected to an audio output jack of one of a computer and a media player.

18. The device of claim 15, wherein the device automatically switches between the programming and operation modes upon detecting an encoded audio signal received via the audio jack.

19. The device of claim 15, wherein the uploaded signal is FSK encoded.

20. The system of claim 15, wherein the programmable memory is located in the handset.

21. The system of claim 15, wherein the programmable memory is located in the base unit.

* * * * *